(12) United States Patent
Menghani et al.

(10) Patent No.: US 12,536,446 B2
(45) Date of Patent: Jan. 27, 2026

(54) TRAINING FIREWALL FOR IMPROVED ADVERSARIAL ROBUSTNESS OF MACHINE-LEARNED MODEL SYSTEMS

(71) Applicant: Google LLC, Mountain View, CA (US)

(72) Inventors: Gaurav Menghani, Santa Clara, CA (US); Ariel Fuxman, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 18/450,156

(22) Filed: Aug. 15, 2023

(65) Prior Publication Data

US 2025/0063060 A1    Feb. 20, 2025

(51) Int. Cl.
*G06N 3/096* (2023.01)
*G06F 21/14* (2013.01)
*G06N 3/08* (2023.01)
*G06V 10/762* (2022.01)

(52) U.S. Cl.
CPC ............. *G06N 3/096* (2023.01); *G06F 21/14* (2013.01); *G06N 3/08* (2013.01); *G06V 10/7625* (2022.01)

(58) Field of Classification Search
CPC .......... G06N 3/096; G06N 3/08; G06F 21/14; G06V 10/7625
See application file for complete search history.

(56) References Cited

U.S. PATENT DOCUMENTS

| | | | |
|---|---|---|---|
| 2018/0268292 A1* | 9/2018 | Choi | G06V 10/454 |
| 2019/0051290 A1* | 2/2019 | Li | G10L 15/063 |
| 2019/0287515 A1* | 9/2019 | Li | G06N 3/084 |
| 2020/0334501 A1* | 10/2020 | Lin | G06F 18/214 |
| 2020/0334538 A1* | 10/2020 | Meng | G10L 15/16 |
| 2022/0012637 A1* | 1/2022 | Rezazadegan Tavakoli | G06N 3/088 |
| 2022/0044125 A1* | 2/2022 | Rangu | G06N 3/088 |
| 2022/0180206 A1* | 6/2022 | Fukuda | G06N 3/045 |

(Continued)

OTHER PUBLICATIONS

Hinton et al., "Distilling the Knowledge in a Neural Network.", arXiv:1503.02531v1, Mar. 9, 2015, 9 pages.

(Continued)

*Primary Examiner* — Shirley X Zhang
(74) *Attorney, Agent, or Firm* — DORITY & MANNING P.A.

(57) ABSTRACT

An example method can include obtaining, by a computing system, a first dataset including first reference inputs and first reference outputs. The example method can include training, by the computing system, a first machine-learned model using the first dataset. The example method can include obtaining, by the computing system, a second dataset including a plurality of second reference inputs, the plurality of second reference inputs obtained from a data corpus based on a distribution of second reference inputs in the second dataset. The example method can include processing, by the computing system and using the first machine-learned model, the plurality of second reference inputs to generate a plurality of second reference outputs corresponding to the plurality of second reference inputs. The example method can include training, by the computing system, a second machine-learned model using the plurality of second reference outputs and the plurality of second reference inputs.

20 Claims, 5 Drawing Sheets

(56) References Cited

U.S. PATENT DOCUMENTS

2024/0211802 A1* 6/2024 Mulla .................. G06V 10/945
2024/0312197 A1* 9/2024 Chiu .................. G06V 10/7753

OTHER PUBLICATIONS

Hu et al., "Teacher-Student Architecture for Knowledge Learning: A Survey.", arXiv:2210.17332v1, Oct. 28, 2022, 12 pages.
Ren et al., "Adversarial Attacks and Defenses in Deep Learning.", Engineering, vol. 6, Issue 3, 2020, pp. 346-360.

\* cited by examiner

TRAINING FIREWALL FOR IMPROVED ADVERSARIAL ROBUSTNESS OF MACHINE-LEARNED MODEL SYSTEMS

FIELD

The present disclosure relates generally to machine learning. More particularly, the present disclosure relates to training machine-learned models.

BACKGROUND

A computer can execute instructions to generate outputs provided some input(s) according to a parameterized model. The computer can use an evaluation metric to evaluate its performance in generating the output with the model. The computer can update the parameters of the model based on the evaluation metric to improve its performance. In this manner, the computer can iteratively "learn" to generate the desired outputs. The resulting model is often referred to as a machine-learned model.

SUMMARY

Aspects and advantages of embodiments of the present disclosure will be set forth in part in the following description, or can be learned from the description, or can be learned through practice of the embodiments.

In an example aspect, the present disclosure provides an example computer-implemented method. The example method can include obtaining, by a computing system, a first dataset including first reference inputs and first reference outputs. The example method can include training, by the computing system, a first machine-learned model using the first dataset. The example method can include obtaining, by the computing system, a second dataset including a plurality of second reference inputs, the plurality of second reference inputs obtained from a data corpus based on a distribution of second reference inputs in the second dataset. The example method can include processing, by the computing system and using the first machine-learned model, the plurality of second reference inputs to generate a plurality of second reference outputs corresponding to the plurality of second reference inputs. The example method can include training, by the computing system, a second machine-learned model using the plurality of second reference outputs and the plurality of second reference inputs.

In an example aspect, the present disclosure provides an example computing system. The example computing system can include one or more processors. The example computing system can include one or more non-transitory computer-readable media storing instructions that are executable by the one or more processors to cause the computing system to perform operations. In the example computing system, the operations can include obtaining a first dataset including first reference inputs and first reference outputs. In the example computing system, the operations can include training a first machine-learned model using the first dataset. In the example computing system, the operations can include obtaining a second dataset including a plurality of second reference inputs, the plurality of second reference inputs obtained from a data corpus based on a distribution of second reference inputs in the second dataset. In the example computing system, the operations can include processing, using the first machine-learned model, the plurality of second reference inputs to generate a plurality of second reference outputs corresponding to the plurality of second reference inputs. In the example computing system, the operations can include training a second machine-learned model using the plurality of second reference outputs and the plurality of second reference inputs.

In an example aspect, the present disclosure provides one or more example non-transitory computer-readable media storing instructions that are executable by one or more processors to cause a computing system to perform operations. In the example non-transitory computer-readable media, the operations can include obtaining a first dataset including first reference inputs and first reference outputs. In the example non-transitory computer-readable media, the operations can include training a first machine-learned model using the first dataset. In the example computing system, the operations can include obtaining a second dataset including a plurality of second reference inputs, the plurality of second reference inputs obtained from a data corpus based on a distribution of second reference inputs in the second dataset. In the example non-transitory computer-readable media, the operations can include processing, using the first machine-learned model, the plurality of second reference inputs to generate a plurality of second reference outputs corresponding to the plurality of second reference inputs. In the example non-transitory computer-readable media, the operations can include training a second machine-learned model using the plurality of second reference outputs and the plurality of second reference inputs.

In an example aspect, the present disclosure provides one or more non-transitory computer-readable media storing a trained machine-learned model, wherein the trained machine-learned model was trained by: obtaining a first dataset comprising first reference inputs and first reference outputs; training a first machine-learned model using the first dataset; obtaining a second dataset comprising a plurality of second reference inputs, the plurality of second reference inputs obtained from a data corpus based on a distribution of second reference inputs in the second dataset; processing, using the first machine-learned model, the plurality of second reference inputs to generate a plurality of second reference outputs corresponding to the plurality of second reference inputs; training a second machine-learned model using the plurality of second reference outputs and the plurality of second reference inputs; and outputting the second machine-learned model as the trained machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to describe the related principles.

BRIEF DESCRIPTION OF THE DRAWINGS

Detailed discussion of embodiments directed to one of ordinary skill in the art is set forth in the specification, which makes reference to the appended figures, in which.

Figure 1:
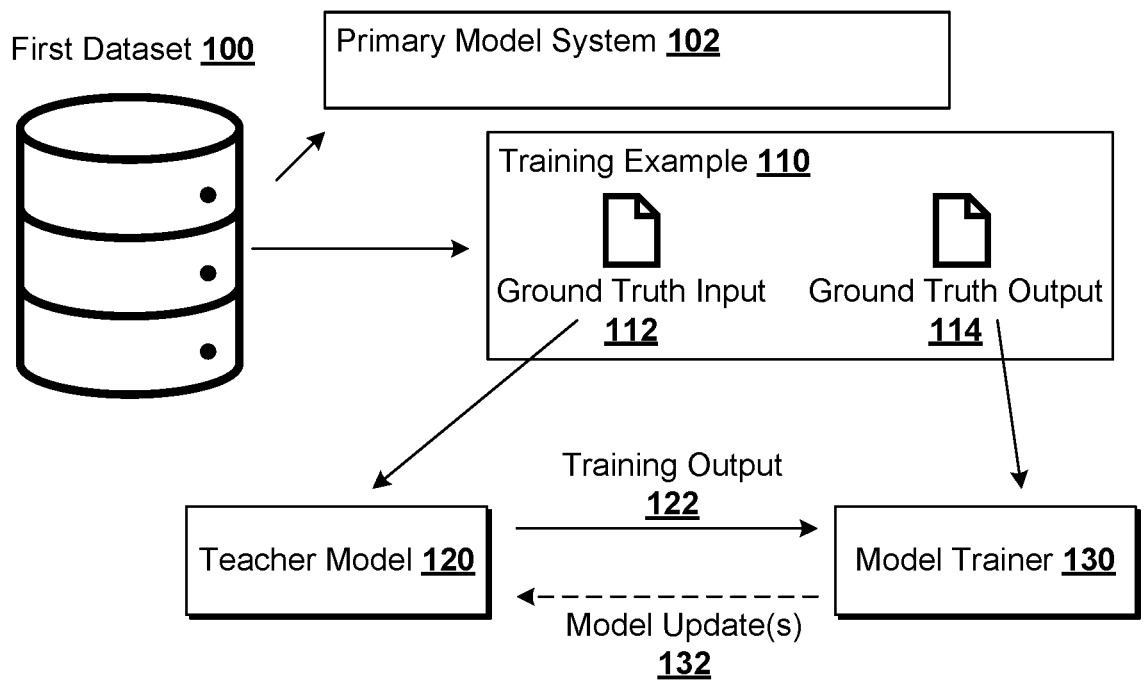
FIG. 1 is a block diagram of an example system for training machine-learned models according to example aspects of some embodiments of the present disclosure.
Figure 1:
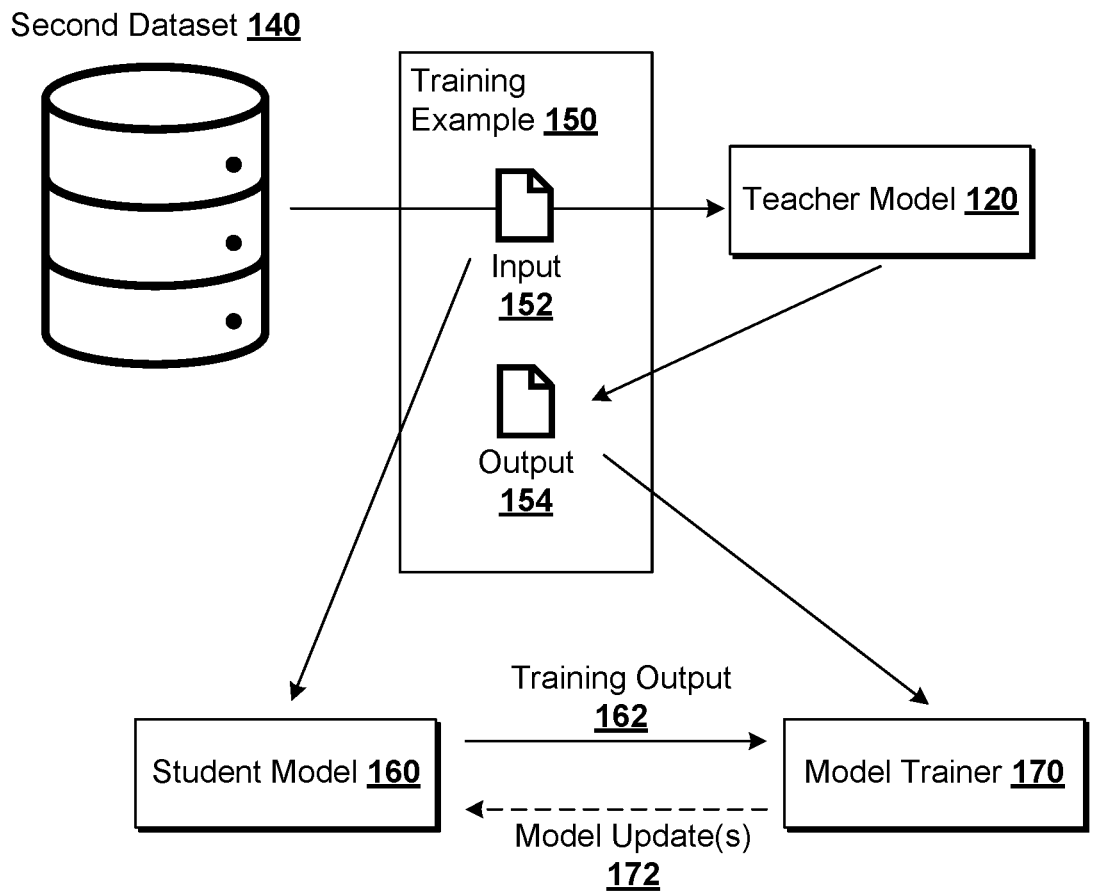

Reference numerals that are repeated across plural figures are intended to identify the same features in various implementations.

DETAILED DESCRIPTION

Overview

Example aspects of the present disclosure generally relate to a training firewall for training machine-learned models to guard against adversarial attack. Example techniques of the present disclosure can provide a training firewall for preventing adversarial actors from leveraging knowledge of a distributed model to exploit a server-side model by implementing a staged, noised training procedure using an intermediary teacher model to train a lightweight student model for distribution. The intermediary teacher, which can have a distinct architecture from the server-side model, can be trained on the same high-quality data as the server-side model. The intermediary teacher can thus obtain much of the performance capability of the server-side model. The intermediary teacher then can be used to label a set of different training data for supervising the training the student model. The different training data can have a different distribution of instances as compared to the high-quality used to train the server-side model.

Adversarial attacks on machine-learned models can involve manipulating inputs to a model to cause the model to diverge from an expected output. For instance, an adversarial attack on a machine vision model (e.g., image processing, LIDAR processing, etc.) could include obtaining an input depicting a subject and perturbing it by an amount that is imperceptible to the human eye but causes the machine vision to not perceive or to misclassify the subject when processing the perturbed input. In this manner, for instance, adversarial inputs can be configured to bypass content filters, disrupt robotic devices or systems that rely on machine vision, bypass security screens, and the like.

An adversarial actor can construct an effective adversarial input by exploring the decision boundary of a target model. When the adversarial actor does not have access to the internal features of the target model, it can be difficult to explore the decision boundary. For instance, when the adversarial actor can only explore the decision boundary by inputting inputs and observing the outputs—essentially trial and error—this process can be time consuming. Further, repeated calls to the model can be detected if the model is being monitored (e.g., a server-side model accessible to the adversarial actor only via an API). However, the risks increase when the model itself is accessible to the adversarial actor. For instance, some on-device technologies can operate with on-device models that can be more easily explored and exploited by adversarial actors. For instance, an adversarial actor might be able to compute gradients across the on-device model to determine how to induce a desired error in the model with the least perceptible perturbation to the input.

Since many traditional techniques of knowledge distillation obtain lightweight, easily distributed models from a large performant model, such traditional techniques can increase the vulnerability of the larger performant models. For instance, an adversarial party might be able to learn exploits using the lightweight model that was distributed to the adversarial actor and apply those exploits to the large performant model.

Advantageously, example techniques of the present disclosure can provide a training firewall for preventing adversarial actors from leveraging knowledge of a distributed model to exploit a server-side model. For instance, a target system can have a server-side machine-learned model that performs a task, such as a security screening task (e.g., classifying communications or other content as fraudulent, etc.). The target system can also be associated with lightweight models that might perform the same or similar tasks in different contexts (e.g., on device). For instance, a server-side model can be a large machine-learned model for performing a task. The target system can operate the server-side model to perform the task. The server-side model can be trained on a high-quality training dataset curated to maximize performance of the model. To train lightweight models for distribution, in lieu of directly training a lightweight model on the high-quality training dataset, example techniques of the present disclosure can train an intermediate, optionally lightweight teacher model on the high-quality training dataset and use the trained teacher model to supervise training of a lightweight student model over a more diverse training dataset. In this manner, for example, the student model can learn one or more decision boundaries informed by the knowledge captured in the high-quality trained dataset but sufficiently differentiated from the server-side model to prevent adversarial knowledge transfer of exploits from the student model to the server-side model.

The more diverse training dataset can be larger than the high-quality, curated dataset. The more diverse training dataset can include noisy labels. The noisy labels can organize the diverse dataset into a number of categories. The number of categories can be a greater number of categories than represented in the high-quality curated dataset. For instance, the high-quality dataset can be focused on expertly labeled instances over a small number of categories.

The intermediate teacher model can process training instances sampled from the diverse dataset. The training instances can be sampled from the diverse dataset based on a desired distribution of instances. For instance, a desired distribution of instances can be determined based on a real-world distribution of instances as expected for the student model to encounter in deployment. A desired distribution of instances can be determined to obscure a distribution of the high-quality dataset. The diverse sampling of training instances can improve recall of the student model.

The intermediate teacher model can provide labels for the instances sampled from the diverse dataset. The labels can be coarser than the categories of the diverse dataset. The labels can be binary (e.g., secure/unsecure, approved/unapproved, compliant/noncompliant, etc.).

The intermediate teacher model can be a different architecture from the server-side model. The intermediate teacher model can be smaller than the server-side model. (e.g., fewer parameters, lower bit-depth parameters, smaller dimensions of one or more layers, etc.).

The intermediate teacher model can be the same as or different from the student model. The student model can be a quantized, pruned, or otherwise reduced version of the teacher model.

Example techniques of the present disclosure can provide a number of technical effects and benefits.

An example technical effect of example implementations of the present disclosure is improved security of machine-learned model systems, thereby improving the field of machine-learned model systems as a whole. Improved security can be obtained by improved robustness to adversarial attack. In this manner, machine-learned model systems can operate with increased reliability and integrity. This can decrease errors and increase performance.

An example technical effect of example implementations of the present disclosure is increased energy efficiency in performing operations using machine-learned models, thereby improving the functioning of computers implementing such models. For instance, by providing a training firewall for training lightweight models while protecting larger more performant models, example techniques of the present disclosure can enable more secure deployment of lightweight models.

By enabling more secure deployment of lightweight models, the present techniques can thus facilitate increased deployment of lightweight models that operate with more energy-efficient runtime execution or inference. In some scenarios, increased energy efficiency can provide for less energy to be used to perform a given task (e.g., less energy expended to maintain the model in memory, less energy expended to perform calculations within the model, etc.). In some scenarios, increased energy efficiency can provide for more task(s) to be completed for a given energy budget (e.g., a larger quantity of tasks, more complex tasks, the same task but with more accuracy or precision, etc.).

In this manner, for instance, the improved energy efficiency of example implementations of the present disclosure can reduce an amount of pollution or other waste associated with implementing machine-learned models and systems, thereby advancing the field of machine-learning and artificial intelligence as a whole. The amount of pollution can be reduced in toto (e.g., an absolute magnitude thereof) or on a normalized basis (e.g., energy per task, per model size, etc.). For example, an amount of $CO_2$ released (e.g., by a power source) in association with training and execution of machine-learned models can be reduced by implementing more energy-efficient training or inference operations. An amount of heat pollution in an environment (e.g., by the processors/storage locations) can be reduced by implementing more energy-efficient training or inference operations.

Further, in this manner, for instance, more secure deployment of lightweight models can facilitate local execution of machine-learned models in resource constrained environments. For instance, more secure deployment of lightweight models can provide for execution of machine-learned models on device. This in turn can avoid or reduce network transmissions that would otherwise be used to communicate with a server-side API. This can decrease bandwidth and other resource usage of a network system. This can also avoid or reduce transmission of data off-device, which can increase privacy of such data by limiting exposure to interception, leak, or other vulnerability during or after transmission.

Reference now is made to the figures, which provide example arrangements of computing systems, model structures, and data flows for illustration purposes only.

FIG. 1 illustrates an example training system according to the present disclosure. A first dataset 100 can contain a number of training examples. First dataset 100 can be used to train a primary model system 102. An example training example 110 can include a ground truth input 112 associated with a ground truth output 114. For instance, ground truth input 112 can be an image and ground truth output 114 can be a classification associated with the image.

First dataset 100 can also be used to train a teacher model 120. The ground truth input 112 can be input to teacher model 120. Teacher model 120 can generate a training output 122. Model trainer 130 can evaluate training output 122 in view of ground truth output 114 to determine one or more model updates 132. In this manner, for example, teacher model 120 may be trained using first dataset 100.

Teacher model 120, when trained, can process data from second dataset 140 to generate training examples. For instance, a training example 150 can include an example input 152. The example input 152 can be processed by teacher model 120 to generate an example output 154. For instance, example input 152 can be an image and example output 154 can be a classification associated with the image. Student model 160 can process example input 152 and generate training output 162. Model trainer 170 (which can be the same as or different from model trainer 130) can evaluate training output 162 in view of example output 154 to determine one or more model updates 172. In this manner, for example, student model 160 can be trained using second dataset 140 as supervised by teacher model 120.

In this manner, for instance, a training firewall can be provided between primary model system 102 and student model 160 while retaining the benefits of the knowledge encoded in first dataset 100.

First dataset 100 can include a labeled dataset of instances. Instances can be any type of data. Instances can include text, images, audio, audiovisual media, encoded data, numerical data, messages, files, documents, etc. First dataset 100 can be curated by human input. First dataset 100 can be labeled by human input. First dataset 100 can be a low-noise dataset with high quality labels.

Training example 110 can include a pairing of a data item and a label or tag associated with the data item. For instance, ground truth input 112 can be a data item obtained from first dataset 100. Ground truth output 114 can be a label or other data associated with the data item.

For instance, first dataset 100 can be a dataset of media items (e.g., images, video, audio) and classifications of the media items (e.g., identification, description, etc.). Ground truth input 112 can be a media item. Ground truth output 114 can be a classification of the media item. Ground truth output 114 can include an indicator of whether ground truth input 112 complies with a media policy.

For instance, first dataset 100 can be a dataset of data transmissions (e.g., transactions, messages or other communications, web content, etc.). Ground truth input 112 can be a data item. Ground truth output 114 can be a classification of the data item. Ground truth output 114 can include an indicator of whether ground truth input 112 is valid or authentic or fraudulent.

Primary model system 102 can include a machine-learned model system configured for operating a machine-learned model to perform a task. For instance, the task can be a classification task. The machine-learned model can process a data item and generate an output classifying the data item. The task can be a security screening task. The machine-learned model can process a data item and generate an output indicating a security status of the data item. The task can be an authentication task. The machine-learned model can process a data item and generate an output indicating an authentication status of the data item.

Teacher model 120 can be a machine-learned model configured to perform one or more tasks performed by primary model system 102. Teacher model 120 can be a machine-learned model having a different architecture from model(s) implemented by primary model system 102. Teacher model 120 can be a smaller model, such as a model with fewer parameters, smaller layers, fewer layers, lower bit depth of parameters, etc.

Training output 122 can be a generated label for the example ground truth input 112. Model trainer 130 can compare training output 122 and ground truth output 114. Model trainer 130 can determine a loss. The loss can correspond to the quality of the training output 122. The loss can indicate a correctness or accuracy of the training output 122.

Model trainer 130 can initiate model update(s) 132. Model trainer 130 can backpropagate a loss through teacher model 120 to determine updates to model parameters of teacher model 120 that would improve the performance of teacher model 120.

To provide a training firewall, a student model 160 can be trained with a second dataset 140.

Second dataset 140 can be larger than first dataset 100. Second dataset 140 can include greater diversity in training examples. Second dataset 140 can include labels generated by machine (e.g., labeled with an image processing model, labeled by heuristic, etc.). Second dataset 140 can include publicly available data (e.g., public datasets).

Second dataset 140 can include the same type or different types of data items as compared to first dataset 100. Second dataset 140 can include a labeled dataset of instances. Instances can be any type of data. Instances can include text, images, audio, audiovisual media, encoded data, numerical data, messages, files, documents, etc.

Second dataset 140 can be weakly labeled. Second dataset 140 can include labels indicating classifications of data items with non-negligible noise or error.

For instance, second dataset 140 can be a dataset of media items (e.g., images, video, audio) and classifications of the media items (e.g., identification, description, etc.). Example inputs from second dataset 140 can be media items. Example outputs from second dataset 140 can be classifications for the media items. Example outputs can include indicators of whether the corresponding example inputs comply with a media policy.

For instance, second dataset 140 can be a dataset of data transmissions (e.g., transactions, messages or other communications, web content, etc.). Example inputs can be data items. Example outputs can be classifications for the data items. Example outputs can include indicators of whether the example inputs are valid or authentic or fraudulent.

Second dataset 140 can include greater diversity of data items as compared to first dataset 100. Second dataset 140 can include example inputs from multiple different classifications. Second dataset 140 can include example inputs from over 10, over 20, over 50, over 100 different classifications, etc. First dataset 100 can include ground truth inputs from less than 100, less than 50, less than 20, less than 10, less than 5 different classifications, etc.

The distribution of examples in second dataset 140 can be different than the distribution of examples in first dataset 100. For example, for a classification task, first dataset 100 can include a large proportion of positive examples to provide strong training signals of a positive example. Second dataset 140 can include a larger proportion of negative examples. For instance, in some real-world applications, runtime inputs might be largely negative. As such, second dataset 140 can provide a more realistic distribution of inputs.

Second dataset 140 can be obtained from a larger corpus of data. Second dataset 140 can be obtained by filtering the data corpus according to one or more filtering criteria. For instance, filtering criteria can be applied on the weak labels of the instances in the data corpus. For instance, second dataset 140 can be constructed to include a subset of the data corpus defined according to a desired distribution of instances. For instance, a data corpus can include, for instance, many categories of data. Second dataset 140 can be crafted to include instances from a subset of the data corpus.

Second dataset 140 can be obtained by converting the noisy label schema to a label schema that matches the output space of the teacher model (e.g., the output space desired for the student model).

For instance, a larger data corpus can include a fine-grained hierarchy of labels. A teacher model can, for instance, be trained to output a coarse classification (e.g., binary flag). To train a student model, second dataset 140 can be constructed by clipping the hierarchy of labels to one of the coarse classifications and obtaining a desired proportion of instances associated with each of the course classifications. In this manner, for instance, the diversity of the large corpus can be maintained while ensuring a robust training distribution of examples in the categories for which the teacher model is trained to identify.

For instance, a larger data corpus can include a wide range of media items classified into a number of categories. A teacher model can be trained to determine whether a media item complies with a media policy. The teacher model can be trained to output a binary flag indicating compliance or noncompliance. Thus it may be desired to obtain a particular proportion of positive and negative examples while also having a diverse representation of positives and negatives. Accordingly, a classification tree of the data corpus can be clipped at a desired level of generality, such that all child nodes of the classification tree issuing from the clipped node can be associated with a positive flag and other child nodes be associated with a negative flag. This coarse division of the data corpus can be used to obtain instances for second dataset 140 that conform to a desired proportion of positive and negatives (e.g., equal proportion, more positives than negatives, more negatives than positives, not significantly more positives than negatives, etc.). In this manner, for example, noisy labels in the data corpus can be used to construct second dataset 140 in a desired fashion.

Teacher model 120 can process example input 152 to generate example output 154. Example output 154 can include a label or tag associated with example input 152.

Student model 160 can process example input 152 to generate training output 162. Training output 162 can include a label or tag associated with example input 152.

Student model 160 can be a machine-learned model configured to perform one or more tasks performed by primary model system 102. Student model 160 can be the same as or different from teacher model 120. Student model 160 can be pretrained over a generic corpus of data, with the technique of FIG. 1 applied for fine tuning. Student model 160 can be trained from scratch (e.g., randomly initialized parameters) according to FIG. 1. Student model 160 can be a lightweight version of teacher model 120. Student model 160 can share one or more architectural features with teacher model 120. Student model 160 can be a quantized or pruned version of teacher model 120. Student model 160 can be a smaller model, such as a model with fewer parameters, smaller layers, fewer layers, lower bit depth of parameters, etc.

Training output 162 can be a generated label for the example input 152. Model trainer 170 can compare training output 162 and example output 154. Model trainer 170 can determine a loss. The loss can correspond to the quality of the training output 162. The loss can indicate a correctness or accuracy of the training output 162 based on the example output 154 as a reference.

Model trainer 170 can initiate model update(s) 172. Model trainer 170 can backpropagate a loss through student model 160 to determine updates to model parameters of student model 160 that would improve the performance of student model 160. Model trainer 170 can be the same or different from model trainer 130.

Example Devices and Systems

Figure 2A:
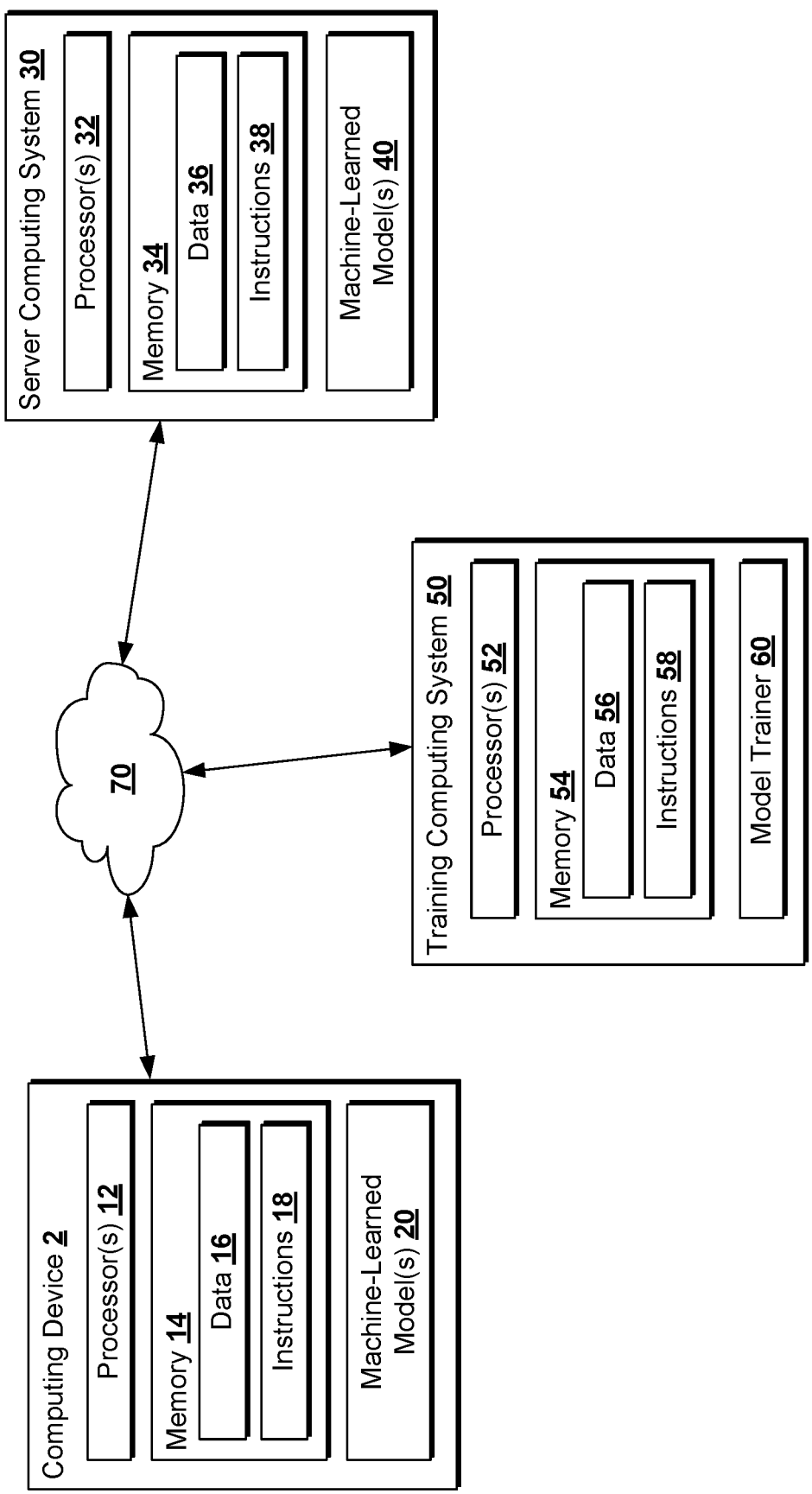
FIG. 2A is a block diagram of an example computing system for training machine-learned models according to example aspects of some embodiments of the present disclosure.

FIG. 2A depicts a block diagram of an example computing system 1 that can perform according to example embodiments of the present disclosure. The system 1 includes a computing device 2, a server computing system 30, and a training computing system 50 that are communicatively coupled over a network 70.

The computing device 2 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to perform operations implementing input data structures and self-consistency output sampling according to example embodiments of the present disclosure, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20.

For example, the machine-learned models 20 can be trained using training techniques described herein. For instance, the machine-learned models 20 can be trained using a training firewall that improves the robustness of a server-side model (E.g., machine-learned model(s) 40) to adversarial attack. For example, machine-learned model(s) 40 can include a teacher model and machine-learned model(s) 20 can include a student model. Machine-learned model(s) 40 can include a server-side model trained on a reference dataset that is protected by the training firewall of the present disclosure against adversarial attacks based on machine-learned model(s) 20. In this manner, for instance, adversarial inputs generated by exploiting access to machine-learned model(s) 20 can have decreased effectiveness when applied against machine-learned model(s) 40.

Additionally, or alternatively, one or more machine-learned models 40 can be included in or otherwise stored and implemented by the server computing system 30 that communicates with the computing device 2 according to a client-server relationship.

The machine-learned models described in this specification may be used in a variety of tasks, applications, and/or use cases. It is to be understood that the techniques described herein may be used for other tasks in various technological fields.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some embodiments, the machine-learned models 40 can be implemented by the server computing system 30 as a portion of a web service (e.g., remote machine-learned model hosting service, such as an online interface for performing machine-learned model operations over a network on remote servers 30). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations (e.g., to perform operations implementing input data structures and self-consistency output sampling according to example embodiments of the present disclosure, etc.).

In some implementations, the server computing system 30 includes or is otherwise implemented by one or more server computing devices. In instances in which the server computing system 30 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the server computing system 30 can train example embodiments of a machine-learned model (e.g., including models 20 or 40) using a pretraining pipeline (e.g., an unsupervised pipeline, a semi-supervised pipeline, etc.). In some embodiments, the computing device 2 or the server computing system 30 can train example embodiments of a machine-learned model (e.g., including models 20 or 40) using a pretraining pipeline by interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations (e.g., to perform operations implementing input data structures and self-consistency output sampling according to example embodiments of the present disclosure, etc.). In some implementations, the training computing system 50 includes or is otherwise implemented by one or more server computing devices.

The model trainer 60 can include a pretraining pipeline for training machine-learned models using various objectives. Parameters of the image-processing model(s) can be trained, in some embodiments, using various training or learning techniques, such as, for example, backwards propagation of errors. For example, an objective or loss can be backpropagated through the pretraining pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pretraining pipeline can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 2A illustrates one example computing system that can be used to implement the present disclosure. Other computing systems can be used as well. For example, in some implementations, the computing device 2 can include the model trainer 60. In some implementations, the computing device 2 can implement the model trainer 60 to personalize the model(s) based on device-specific data.

Figure 2B:
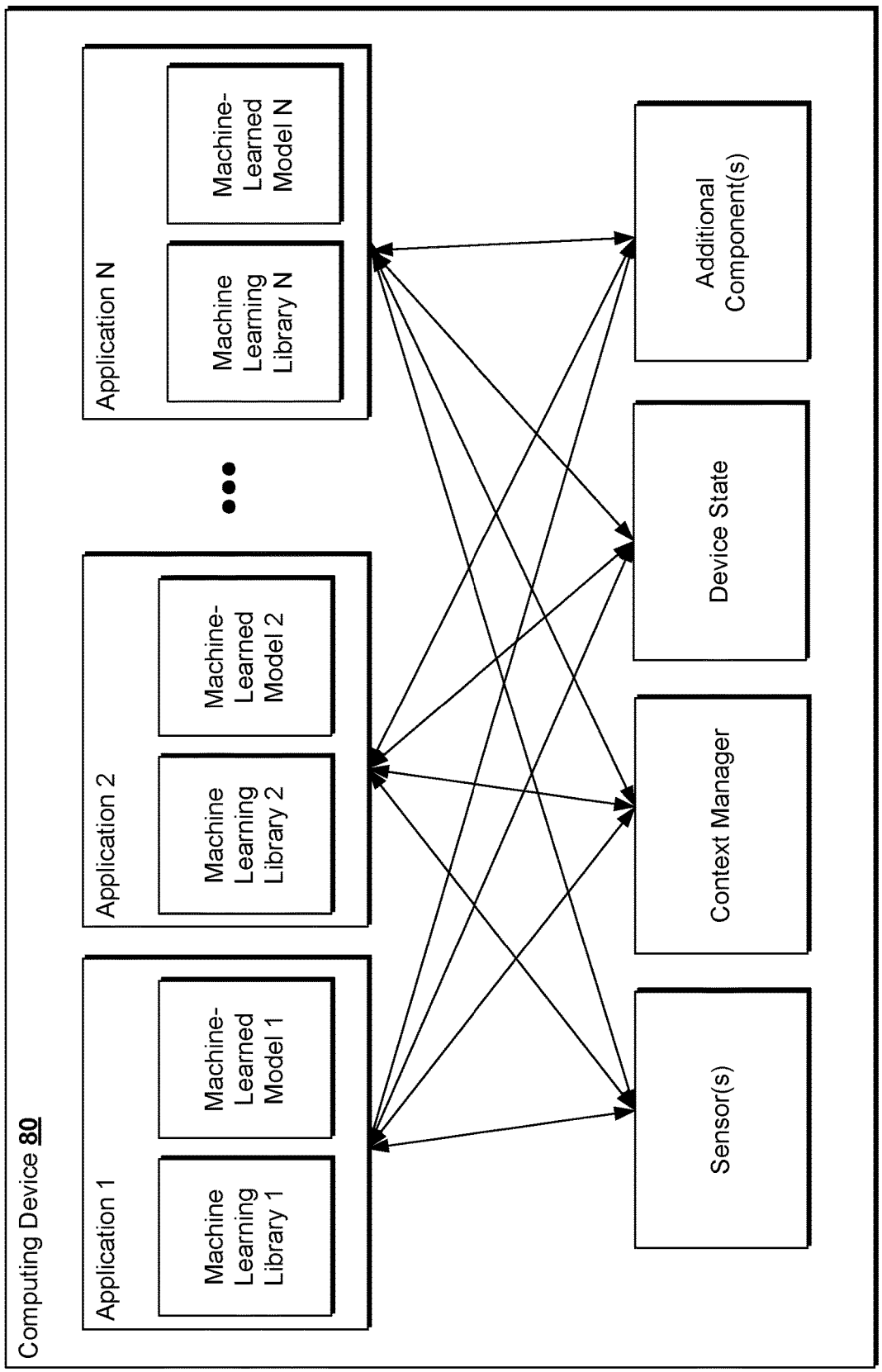
FIG. 2B is a block diagram of an example computing device for training machine-learned models according to example aspects of some embodiments of the present disclosure.

FIG. 2B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 2B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 2C:
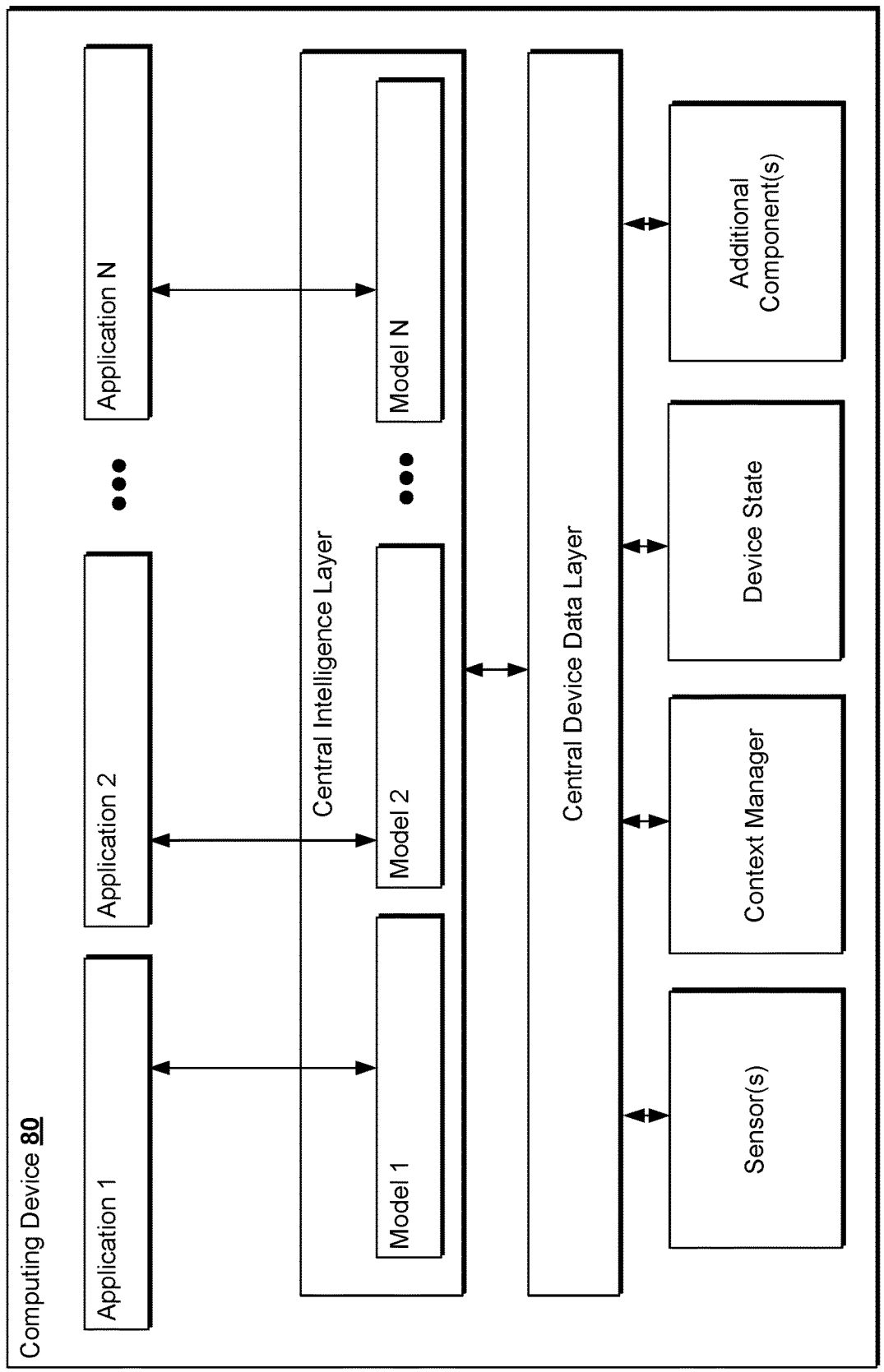
FIG. 2C is a block diagram of an example computing device for training machine-learned models according to example aspects of some embodiments of the present disclosure.

FIG. 2C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 2C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 2C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

Figure 3:
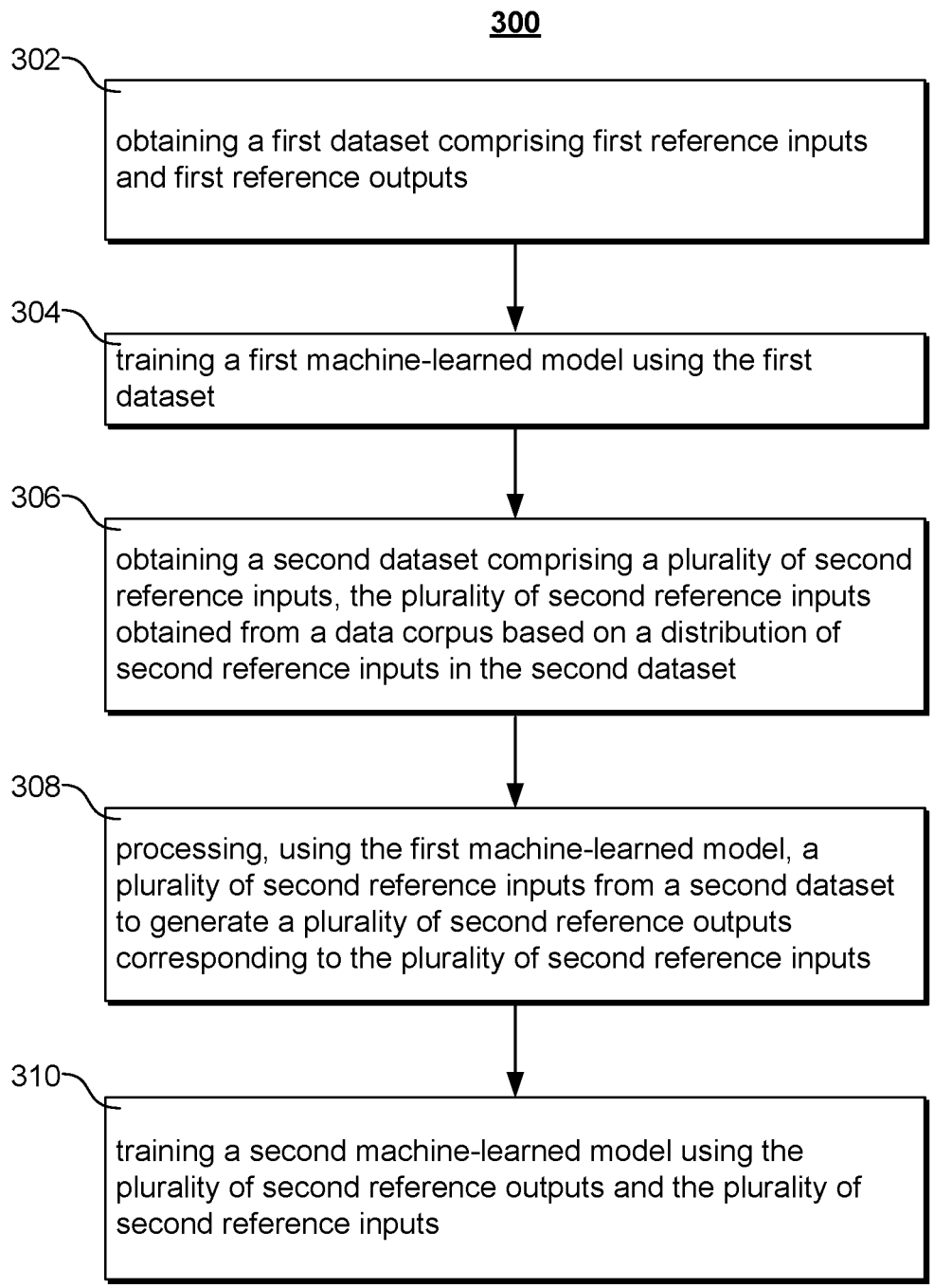
FIG. 3 is a flow chart diagram of an example method for training machine-learned models according to example aspects of some embodiments of the present disclosure.

FIG. 3 depicts a flow chart diagram of an example method 300 to perform according to example embodiments of the present disclosure. Example method 300 can be implemented by one or more computing systems (e.g., one or more computing systems as discussed with respect to FIGS. 1 to 2C). Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, example method 300 can include obtaining a first dataset including first reference inputs and first reference outputs. For instance, the first dataset can be first dataset 100 containing ground truth input 112 and ground truth output 114.

At 304, example method 300 can include training a first machine-learned model using the first dataset. For instance, the first machine-learned model can be teacher model 120.

At 306, example method 300 can include obtaining a second dataset including a plurality of second reference inputs. The second dataset can be second dataset 140. The second dataset can include training example 150. The plurality of second reference inputs can be obtained from a data corpus based on a distribution of second reference inputs in the second dataset.

At 308, example method 300 can include processing, using the first machine-learned model, the plurality of second reference inputs to generate a plurality of second reference outputs corresponding to the plurality of second reference inputs. For instance, teacher model 120 can process an input 152 of training example 150 to generate an output 154 to form part of training example 150.

At 310, example method 300 can include training a second machine-learned model using the plurality of second reference outputs and the plurality of second reference inputs. For instance, the second machine-learned model can be student model 160.

In some implementations of example method 300, the data corpus includes labels for the second reference inputs, the labels comprising a plurality of label categories. For instance, the data corpus can include a large set of labeled instances (e.g., data items). The labels can be used to organize the corpus.

In some implementations of example method 300, the plurality of second reference outputs includes a plurality of output categories, the plurality of output categories of the second reference outputs being fewer than the plurality of label categories of the labels. For instance, the first dataset can include coarse classifications or signals. For instance, the first dataset can include binary classifications, such as "approved" or "disapproved," "suspicious" or "not suspicious," etc.

The corpus can include various other labels for different categories. For instance, the corpus can be organized with a hierarchy of labels. For instance, a corpus of images can be organized according to a subject of the image. The subjects can be organized in a tree structure. For instance, one node of the tree may be "automobiles." Child nodes of that node can include, for instance, "car" and "truck."

The categories of the corpus labels may or may not align with the classifications desired from the first dataset or the first machine-learned model. Example method 300 can include composing the second dataset by respectively mapping subsets of the plurality of label categories respectively to the plurality of output categories.

In some implementations of example method 300, the mapping is obtained by segmenting a tree structure of the plurality of label categories. For instance, a content policy can be used to map subjects of images under various tree nodes to the output categories. For example, data items associated with the branch of the tree "automobiles" can be mapped to an "approved" output category according to a content policy that approves of images of automobiles. Similarly, data items associated with a branch of the tree "branded commercial materials" can be mapped to a "disapproved" output category according to a content policy that disapproves of images depicting brand names or other commercial materials.

In this manner, for instance, a second dataset can be constructed to achieve a desired distribution of examples associated with the different output categories. In some implementations of example method 300, the mapping is determined based on a desired distribution of the plurality of output categories in the second dataset. For instance, for a binary output set, a desired distribution can be 50:50, 60:40, 70:30, or any other distribution. Other output sets can have other distributions. Examples can be retrieved from the corpus to populate the second dataset to achieve the desired distribution. A subset of examples can be retrieved from the corpus (e.g., a portion of the corpus being mapped to the output set, with another portion of the corpus being left out).

The mapping can be manually tuned or automatically generated. The mapping can be implemented in one or more stages that can include both manual tuning and automatic generation. For instance, a machine-learned model (e.g., a language model) can process the labels in the corpus to predict, based on the label, which of the output categories would be associated with it. This can provide the mapping or a starting point from which the mapping can be manually tweaked or tuned.

In some implementations of example method 300, the second machine-learned model is smaller than the first machine-learned model. In some implementations of example method 300, the second machine-learned model is obtained by quantizing, pruning, or otherwise reducing a computational complexity of the first machine-learned model.

Example method 300 can include evaluating a vulnerability induced in a third machine-learned model that is trained using the first dataset. Example method 300 can include adjusting, based on the evaluation, the distribution of second reference inputs in the second dataset to decrease the vulnerability.

Example method 300 can include evaluating the vulnerability by generating an adversarial example using the second machine-learned model, the adversarial example based on a ground-truth example. Example method 300 can include evaluating the vulnerability by inputting the ground-truth example to the third machine-learned model to generate a normal runtime output. Example method 300 can include evaluating the vulnerability by inputting the adversarial example to the third machine-learned model to generate an adversarial output. Example method 300 can include evaluating the vulnerability by comparing the normal runtime output and the adversarial output. In this manner, for instance, an effective change in the classification performance of the third machine-learned model can be identified and attributed to the adversarial example generated by exploiting the access to the second machine-learned model. For instance, the second machine-learned model can be a model that is distributed publicly (e.g., this model can be a machine-learned model(s) 20), while the third machine-learned model can be a model that is operated and maintained outside of public access (e.g., this model can be a machine-learned model(s) 40).

In this manner, for instance, the exposure of the third machine-learned model to the risk of adversarial manipulation due to the distribution of the second machine-learned model can be determined. Further, this can facilitate optimization of the training of second machine-learned model (e.g., For instance, a meta-learning loop can be formed to decrease the change in performance of the third model attributable to the adversarial attack. For instance, a reinforcement learning loop can be formed. An agent can seek to increase a reward or decrease a penalty by adjusting one or more parameters of the training of second machine-learned model (e.g., by tweaking the composition of the second dataset).

Example method 300 can include distributing, in a networked computing environment, the trained second machine-learned model to a plurality of client devices (e.g., computing device 2) to perform one or more tasks on the client devices. In some implementations of example method 300, the networked computing environment includes a server computing system (e.g., server computing system 30) implementing a server-side machine-learned model trained on the first dataset.

Example method 300 can include operating a server-side machine-learned model service for performing a task, wherein the server-side machine-learned model service implements a server-side machine-learned model trained on the first dataset.

Example method 300 can include providing external access to an application programming interface of the server-side machine-learned model service for performing the task on behalf of one or more external devices.

In some implementations of example method 300, as compared to the first machine-learned model, the second machine-learned model can induce less adversarial vulnerability in the server-side machine-learned model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Also, terms such as "based on" should be understood as "based at least in part on."

What is claimed is:

1. A computer-implemented method, the method comprising:
    obtaining, by a computing system, a first dataset comprising first reference inputs and first reference outputs;
    training, by the computing system, a first machine-learned model using the first dataset;
    obtaining, by the computing system, a second dataset comprising a plurality of second reference inputs, the plurality of second reference inputs obtained from a data corpus, wherein the plurality of second reference inputs correspond to a plurality of label categories in a hierarchy of labels represented in the data corpus;
    processing, by the computing system and using the first machine-learned model, the plurality of second reference inputs to generate a plurality of second reference outputs corresponding to the plurality of second reference inputs, the plurality of second reference outputs corresponding to an output category, the plurality of label categories corresponding to child nodes of the output category in the hierarchy of labels represented in the data corpus;
    training, by the computing system, a second machine-learned model using the plurality of second reference outputs and the plurality of second reference inputs;
    generating, by the computing system, an adversarial example using the second machine-learned model, the adversarial example based on a ground-truth example;
    inputting, by the computing system, the ground-truth example to a third machine-learned model to generate a normal runtime output, the third machine-learned model trained on the first dataset;
    inputting, by the computing system, the adversarial example to the third machine-learned model to generate an adversarial output; and
    comparing, by the computing system, the normal runtime output and the adversarial output to evaluate adversarial knowledge transfer between the second machine-learned model and the third machine-learned model;
    wherein the third machine-learned model has a different architecture from the first machine-learned model.

2. The computer-implemented method of claim 1, comprising:
    obtaining, by the computing system, a plurality of third reference inputs that correspond to a second plurality of label categories in the hierarchy of labels represented in the data corpus; and
    processing, by the computing system and using the first machine-learned model, the plurality of third reference inputs to generate a plurality of third reference outputs corresponding to the plurality of third reference inputs, the plurality of third reference outputs corresponding to a second output category, the second plurality of label categories corresponding to child nodes of the second output category in the hierarchy of labels represented in the data corpus.

3. The computer-implemented method of claim 1, wherein a plurality of output categories comprising the output category are coarser than the plurality of label categories.

4. The computer-implemented method of claim 3, comprising:
    composing, by the computing system, the second dataset by respectively mapping subsets of the plurality of label categories respectively to the plurality of output categories.

5. The computer-implemented method of claim 4, wherein the mapping is determined based on a desired proportion of the output category in the second dataset.

6. The computer-implemented method of claim 1, wherein the first machine-learned model is smaller than the third machine-learned model.

7. The computer-implemented method of claim 1, comprising:
    evaluating, by the computing system, a vulnerability induced in a third machine-learned model that is trained using the first dataset; and
    based on the evaluation adjusting, by the computing system, a proportion of the output category to decrease the vulnerability.

8. The computer-implemented method of claim 1, comprising:
    distributing, by the computing system and in a networked computing environment, the trained second machine-learned model to a plurality of client devices to perform one or more tasks on the client devices;
    wherein the networked computing environment comprises a server computing system implementing a server-side machine-learned model trained on the first dataset.

9. The computer-implemented method of claim 8, wherein, as compared to the first machine-learned model, the second machine-learned model can induce less adversarial vulnerability in the server-side machine-learned model.

10. The computer-implemented method of claim 1, comprising:
    operating a server-side machine-learned model service for performing a task, wherein the server-side machine-learned model service implements a server-side machine-learned model trained on the first dataset.

11. The computer-implemented method of claim 10, comprising:
    providing external access to an application programming interface of the server-side machine-learned model service for performing the task on behalf of one or more external devices.

12. A computing system, comprising:
    one or more processors; and
    one or more non-transitory computer-readable media storing instructions that are executable by the one or more processors to cause the computing system to perform operations, the operations comprising:
        obtaining a first dataset comprising first reference inputs and first reference outputs;
        training a first machine-learned model using the first dataset;
        obtaining a second dataset comprising a plurality of second reference inputs, the plurality of second reference inputs obtained from a data corpus, wherein the plurality of second reference inputs correspond to a plurality of label categories in a hierarchy of labels represented in the data corpus;

processing, using the first machine-learned model, the plurality of second reference inputs to generate a plurality of second reference outputs corresponding to the plurality of second reference inputs, the plurality of second reference outputs corresponding to an output category, the plurality of label categories corresponding to child nodes of the output category in the hierarchy of labels represented in the data corpus;

training a second machine-learned model using the plurality of second reference outputs and the plurality of second reference inputs;

generating an adversarial example using the second machine-learned model, the adversarial example based on a ground-truth example;

inputting the ground-truth example to a third machine-learned model to generate a normal runtime output, the third machine-learned model trained on the first dataset;

inputting the adversarial example to the third machine-learned model to generate an adversarial output; and comparing the normal runtime output and the adversarial output to evaluate adversarial knowledge transfer between the second machine-learned model and the third machine-learned model;

wherein the third machine-learned model has a different architecture from the first machine-learned model.

13. The computing system of claim 12, wherein the operations comprise:

distributing, in a networked computing environment, the trained second machine-learned model to a plurality of client devices to perform one or more tasks on the client devices;

wherein the networked computing environment comprises a server computing system implementing a server-side machine-learned model trained on the first dataset.

14. The computing system of claim 13, wherein, as compared to the first machine-learned model, the second machine-learned model can induce less adversarial vulnerability in the server-side machine-learned model.

15. The computing system of claim 12, wherein a plurality of output categories comprising the output category are coarser than the plurality of label categories, and wherein the operations comprise:

composing the second dataset by respectively mapping subsets of the plurality of label categories respectively to the plurality of output categories.

16. The computing system of claim 15, wherein the mapping is determined based on a desired proportion of the output category in the second dataset.

17. The computing system of claim 12, the operations comprising:

evaluating a vulnerability induced in a third machine-learned model that is trained using the first dataset; and based on the evaluation, adjusting a proportion of the output category to decrease the vulnerability.

18. The computing system of claim 12, comprising:

a server-side machine-learned model service for performing a task, wherein the server-side machine-learned model service implements a server-side machine-learned model trained on the first dataset.

19. The computing system of claim 18, comprising:

an application programming interface of the server-side machine-learned model service for performing the task on behalf of one or more external devices.

20. One or more non-transitory computer-readable media storing a trained machine-learned model, wherein the trained machine-learned model was trained by:

obtaining a first dataset comprising first reference inputs and first reference outputs;

training a first machine-learned model using the first dataset;

obtaining a second dataset comprising a plurality of second reference inputs, the plurality of second reference inputs obtained from a data corpus, wherein the plurality of second reference inputs correspond to a plurality of label categories in a hierarchy of labels represented in the data corpus;

processing, using the first machine-learned model, the plurality of second reference inputs to generate a plurality of second reference outputs corresponding to the plurality of second reference inputs, the plurality of second reference outputs corresponding to an output category, the plurality of label categories corresponding to child nodes of the output category in the hierarchy of labels represented in the data corpus;

training a second machine-learned model using the plurality of second reference outputs and the plurality of second reference inputs;

generating an adversarial example using the second machine-learned model, the adversarial example based on a ground-truth example;

inputting the ground-truth example to a third machine-learned model to generate a normal runtime output, the third machine-learned model trained on the first dataset;

inputting the adversarial example to the third machine-learned model to generate an adversarial output; and comparing the normal runtime output and the adversarial output to evaluate adversarial knowledge transfer between the second machine-learned model and the third machine-learned model; and outputting the second machine-learned model as the trained machine-learned model;

wherein the third machine-learned model has a different architecture from the first machine-learned model.

* * * * *